United States Patent [19]

Cass

[11] 3,820,415
[45] June 28, 1974

[54] RACK AND PINION ASSEMBLY

[75] Inventor: Richard Cass, Birmingham, Mich.

[73] Assignee: TRW Inc., Cleveland, Ohio

[22] Filed: Mar. 1, 1973

[21] Appl. No.: 337,120

[52] U.S. Cl. .................................. 74/498, 74/409
[51] Int. Cl. ....................... B62d 1/20, F16h 55/18
[58] Field of Search ...................... 74/498, 422, 409

[56] References Cited
UNITED STATES PATENTS

| | | | |
|---|---|---|---|
| 2,703,497 | 3/1955 | Townsend | 74/409 X |
| 3,347,110 | 10/1967 | Wilson | 74/409 X |
| 3,593,593 | 7/1971 | Bradshaw | 74/498 |
| 3,661,032 | 5/1972 | Jenvey | 74/498 |
| 3,756,340 | 9/1973 | Millard | 74/498 X |
| 3,762,240 | 10/1973 | Adams | 74/498 |

*Primary Examiner*—Leonard H. Gerin
*Attorney, Agent, or Firm*—Hill, Gross, Simpson, Van Santen, Steadman, Chiara & Simpson

[57] ABSTRACT

Rack and pinion assemblies, especially for automotive steering gear, having an adjustable rack bar mounting in the pinion housing with an eccentric portion on the side of the rack bar opposite the toothed rack portion thereof to bias the rack bar toward the pinion. The mounting may be locked in fixed position after the desired bias has been developed or it may be spring loaded to provide a wear take-up feature for maintaining the rack and pinion teeth in fully meshed engagement as wear develops.

17 Claims, 11 Drawing Figures

RACK AND PINION ASSEMBLY

FIELD OF THE INVENTION

This invention relates to the art of rack and pinion assemblies, especially suited for automotive steering gear, and particularly deals with eccentric bearing mountings which will maintain the rack and pinion teeth in proper meshed relationship.

PRIOR ART

Heretofore the rack bars of automotive rack and pinion steering gear were biased toward the pinion by spring-loaded yokes slidably supporting the rack bar opposite the pinion. These yokes were slidably mounted in tubular bosses or extensions of the pinion housing and were independent of the bearings which mounted the rack bar in its housing. An example of these prior art constructions is shown in the F. J. Adams U.S. Pat. No. 3,352,170, issued Nov. 14, 1967.

SUMMARY OF THE INVENTION

This invention provides an eccentric bearing mounting for the rack bars of rack and pinion assemblies to maintain the rack teeth and the pinion teeth in properly meshed relationship without the heretofore required spring-loaded yokes and yoke housings. According to this invention a pinion housing of simplified configuration rotatably mounts a pinion and receives therethrough a rack bar having the teeth of its rack portion meshed with the pinion. This housing is fitted with a bearing having an eccentric portion forcing the rack bar toward the pinion. In one form the bearing is rotatably mounted in an end of the pinion housing and has an inside diameter eccentric with its outside diameter so that when it is rotated in the housing its eccentric portion will engage the side of the rack bar opposite the rack teeth and will force the rack bar toward the pinion so that the rack and pinion teeth will be properly meshed. Then, the bearing may be staked or otherwise locked in its fixed adjusted position in the housing or it may be spring-biased to provide a wear take-up feature which will continue to urge the eccentric portion against the rack bar as wear develops between the rack and pinion. In another embodiment the eccentric bearing may take the form of a wedge segment riding in a recess in the pinion housing and positioned or biased to force the rack bar toward the pinion. These eccentric bearing mounting for the rack bar eliminate the necessity for the separate yokes of the prior art and greatly simplify the casting or forging forming the pinion housing.

The invention will hereinafter be specifically described as embodied in a rack and pinion steering gear for an automotive vehicle, but it should be understood that the principles of this invention are not limited to such particular usage and it is intended that the scope of the patent to be granted on this application include all fields of use for the invention.

It is then an object of this invention to provide a rack and pinion assembly with an adjustable eccentric rack bar bearing to position the rack teeth in proper meshed engagement with the pinion teeth.

Another object of the invention is to eliminate heretofore required spring-loaded yokes in automotive steering gear while maintaining proper meshed engagement between the rack and pinion teeth.

Another object of this invention is to provide an inexpensive eccentric bearing mounting for the rack bars of rack and pinion assemblies which will maintain the rack and pinions of such assemblies in proper gear-meshed relationship.

Another object of this invention is to provide an automotive rack and pinion steering assembly with a pinion housing that is fitted with an eccentric bearing adjacent the pinion to wedge the rack bar toward the pinion.

A still further object of this invention is to provide automotive rack and pinion steering gear with pinion housings that are fitted with eccentric bearing means to adjust the rack bar relative to the pinion.

A specific object of the invention is to provide an automotive rack and pinion steering gear with a pinion housing carrying in one end a rotatable bearing having an eccentric portion which will bias the rack bar toward the pinion and which bearing is easily locked in the pinion housing.

Another specific object of the invention is to provide an automotive rack and pinion steering gear with a pinion housing carrying a rotatable eccentric bearing that is spring biased to force the rack bar toward the pinion.

A further specific object of the invention is to provide an automotive rack and pinion steering gear with a pinion housing slidably supporting an eccentric wedge for acting on the rack bar to urge it toward the pinion.

Other and further objects of this invention will become apparent to those skilled in this art from the following detailed description of the annexed sheets of drawings which, by way of preferred examples only, illustrate several embodiments of the invention.

DESCRIPTION OF THE PREFERRED EMBODIMENTS

Figure 1:
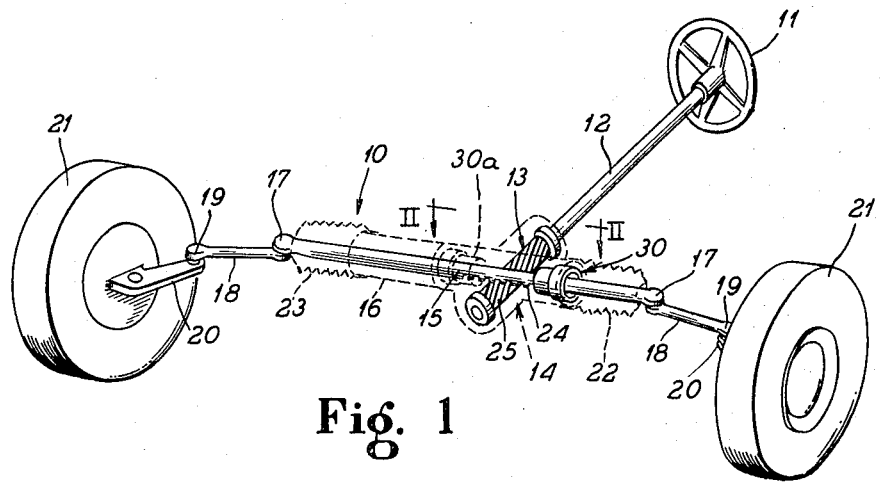
FIG. 1 is a somewhat diagrammatic isometric view of an automotive rack and pinion steering gear equipped with an eccentric rack bar bearing according to this invention.

In FIG. 1 the reference numeral 10 indicates generally a rack and pinion steering gear for an automobile. This gear 10 includes a steering wheel 11 on an end of a steering shaft 12 which is coupled to a pinion 13 rotatably supported in a pinion housing 14. A rack bar 15 is slidable through the pinion housing 14 and through a tubular housing 16 secured on one end of the pinion housing. The ends of the rack bar are connected by ball and socket joints 17, 17 to tie rods 18, 18. The outboard ends of these tie rods 18, 18 are connected by ball and socket joints 19, 19 to the steering arms 20, 20 of vehicle wheels 21, 21. A rubber bellows boot seal 22 is fitted over one end of the pinion housing 14 to envelop the rack bar 15 up to the ball joint 17 on the end thereof. A similar bellows type boot seal 23 envelops the end of the tube 16 and surrounds the other end of the rack bar up to the ball joint 17. The central portion of the rack bar 15 has a rack with teeth 24 on the bottom face thereof meshed with spiral teeth 25 of the pinion 13.

Figure 2:
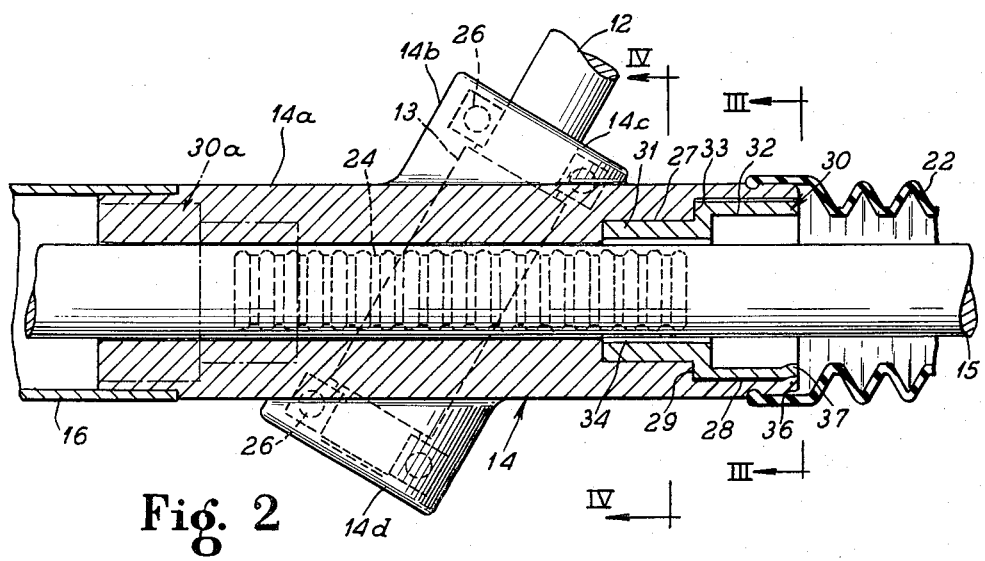
FIG. 2 is a top plan view of the rack and pinion portion of the assembly of FIG. 1 and with the pinion housing in horizontal section.

The pinion housing 14 as best shown in FIG. 2 has a longitudinally extending main tubular portion 14a receiving the rack bar 15 free therethrough and a transverse tubular portion 14b extending at an angle of about 45° relative to the portion 14a. The interiors of the tubular portions 14a and 14b are in open communication.

The pinion 13 is rotatably mounted in the tubular boss portion 14b of the housing 14 on ball bearings 26 positioned at opposite ends of the spiral pinion teeth 25 and the steering shaft 13 extends through an open end 14c of the boss portion 14b while the opposite end 14d is closed and bottoms one of the bearings 26.

In accordance with this invention one end of the tubular housing portion 14a of the pinion housing 14, such as the outboard end has a cylindrical bore 27 and an enlarged counterbore 28 extending therefrom through the end of the housing with a shoulder 29 between the two bores. A tubular bearing 30 has a reduced diameter cylindrical portion 31 snugly seated in the bore 27 and a large diameter portion 32 freely fitted in the bore 28. A shoulder 33 between the portions 31 and 32 is bottomed on the housing shoulder 29.

The portion 31 has an eccentric bore 34 receiving the rack bar 15 therethrough with the bore of large enough diameter so that it only engages that portion of the rack bar opposite the rack teeth.

Figure 3:
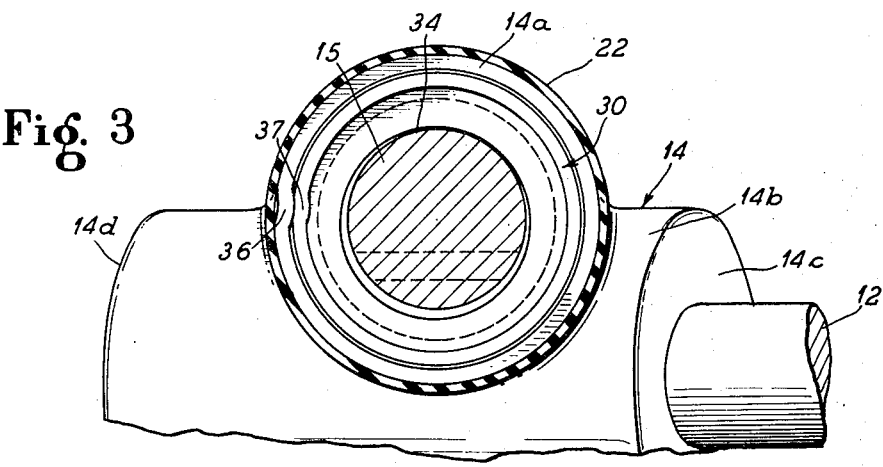
FIG. 3 is a transverse sectional view along the line III—III of FIG. 2.
Figure 4:
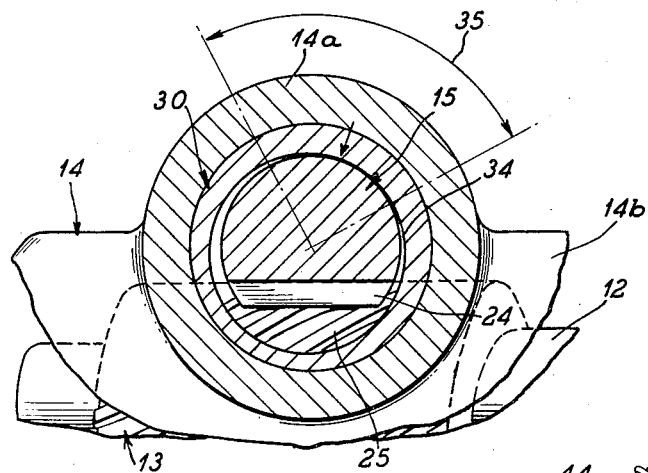
FIG. 4 is a transverse sectional view along the line IV—IV of FIG. 2.

As shown in FIGS. 3 and 4 the rack bar 15 is circular in cross section with the rack portion thereof being a flat cut-off intermediate portion on which the teeth 24 are provided. The bore 34 of the tubular bearing 30 freely embraces the rack bar 15 except for a portion thereof opposite the rack which slidably engages the rack bar. The arrangement is such that the region of contact between the bore wall 34 and the rack bar 15 will lie between a 90° arc designated between the arrows 35 in FIG. 4. Thus, the bearing 30 will have sliding contact with the rack bar 15 somewhere in the zone 35 depending upon the variations in dimensions of the assemblies such as will occur in mass production.

After assembly of the rack and pinion units in the housing 14 the bearing 30 is rotated in the housing bores to position the eccentric bore 34 so that its surface will engage the rack bar 15 in the region 35. Rotation of the bearing is continued to force the rack bar toward the pinion until the teeth 24 are properly meshed with the pinion teeth 25. This, of course, will take up all looseness in the assembly.

If desired the interior wall of the enlarged bearing portion 32 can be shaped with flats or have a square or rectangular configuration to receive a rotating tool.

After the bearing 30 is rotated to properly thrust the rack bar toward the pinion the open end of the housing portion 14a receiving the bearing can be staked as shown in FIGS. 2 and 3 at 36 as by means of a prick punch or the like to depress the bearing as at 37 thereby locking the bearing against rotation in the housing bore.

Instead of mounting the bearing 30 at the outboard end of the pinion housing 15 it could be mounted at the inboard end of the housing as shown in dotted lines at 30a in FIG. 2. Further, bearings 30 could be provided at both ends of the tubular housing portion 14a.

Alternately, the bore 34 of the bearing 30 could be concentric with the rack bar 15 and the bore 27 of the housing could be eccentric to the axis of the rack bar, thereby obtaining the same wedge adjustment upon rotation of the bearing.

Figure 5:
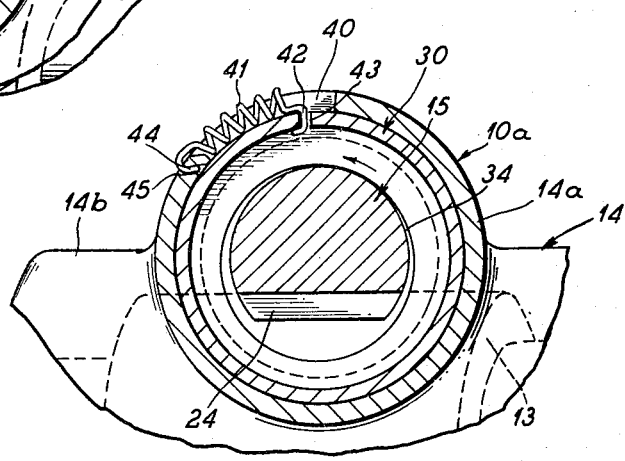
FIG. 5 is a view similar to FIG. 4 but showing a springbiased eccentric bearing arrangement according to this invention.

In a modification 10a shown in FIG. 5, instead of fixedly staking the bearing 30 to the pinion housing 14, the bearing is spring urged into its eccentric thrust position against the rack bar 15. In FIG. 5 parts identical with parts described in FIGS. 1 to 4 have been marked with the same reference numerals and as there shown, a circumferential slot 40 is provided in the pinion housing portion 14a at the end thereof receiving the bearing 30. This slot receives a tension spring 41 having one end 42 anchored in hole 43 of the large diameter portion of the bearing 30 and an opposite end 44 anchored in a hole 45 in the housing portion 14a. This spring 41 pulls the bearing 30 to rotate in the direction of the arrow so that its eccentric bore 34 will slidably engage and support the rack bar 15 opposite the rack teeth 24. In this modification a continuous wear take-up feature is thus provided since the spring will continuously maintain a biasing thrust on the rack bar urging it toward the pinion 13.

Figure 6:
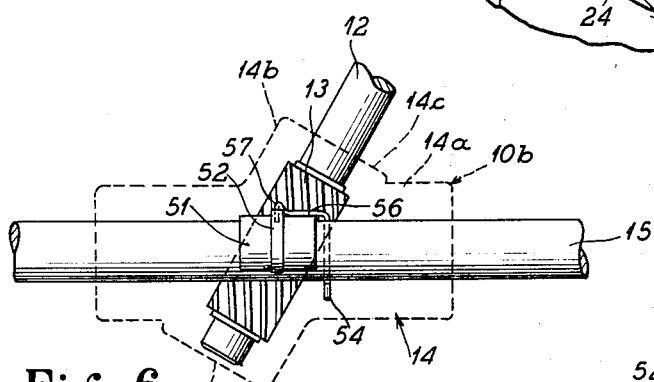
FIG. 6 is a plan view of a modification of the rack and pinion with a spring-biased eccentric bearing wedge.
Figure 8:
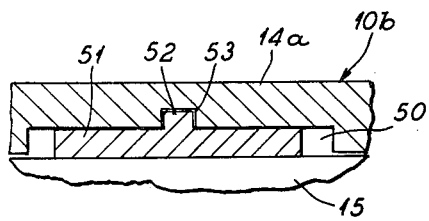
FIG. 8 is a fragmentary longitudinal sectional view along the line VIII—VIII of FIG. 7.
Figure 7:
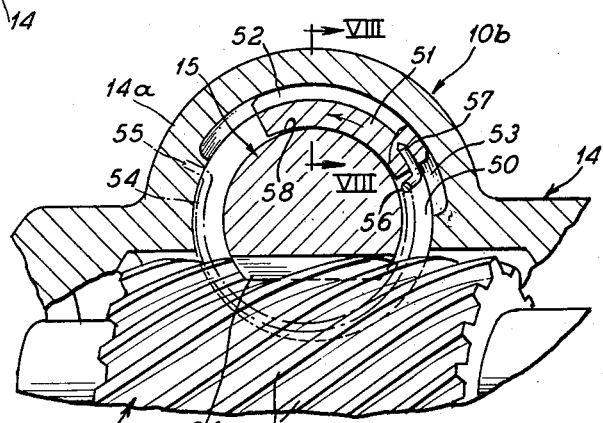
FIG. 7 is a transverse sectional view along the line VII—VII of FIG. 6.

In a second modification 10b shown in FIGS. 6 to 8 parts identical with parts described in FIGS. 1 to 4 have been marked with the same reference numerals.

In the assembly 10b the rack bar receiving portion 14a of the pinion housing 14 has a fragmental cylindrical recess 50 overlying the rack bar and slidably supporting a bearing 51 in the form of a wedge segment. This wedge 51 has an external peripheral rib 52 at the mid portion thereof slidably seated in a groove 53 of the recess 50. The widge 51 is thus held against axial shifting in the recess 50 but is free to rotate in the recess.

A wire hairpin-type or single coil spring 54 embraces the rack bar 15 along one side of the pinion 13 and is anchored at one end 55 in a hole in the housing portion 14a and then extends circumferentially around the rack bar 15 to a lateral offset portion 56 extending over the outer periphery of the wedge 51 to an end 57 anchored in the rib portion 53 of the wedge. The spring bias is such as to urge the wedge in a counterclockwise direction with the spring tending to close its open gap between the ends 55 and 57. This bias advances the wedge so that is eccentric concave surface 58 will engage the top portion of the rack bar 15 opposite the rack teeth 24.

Figure 9:
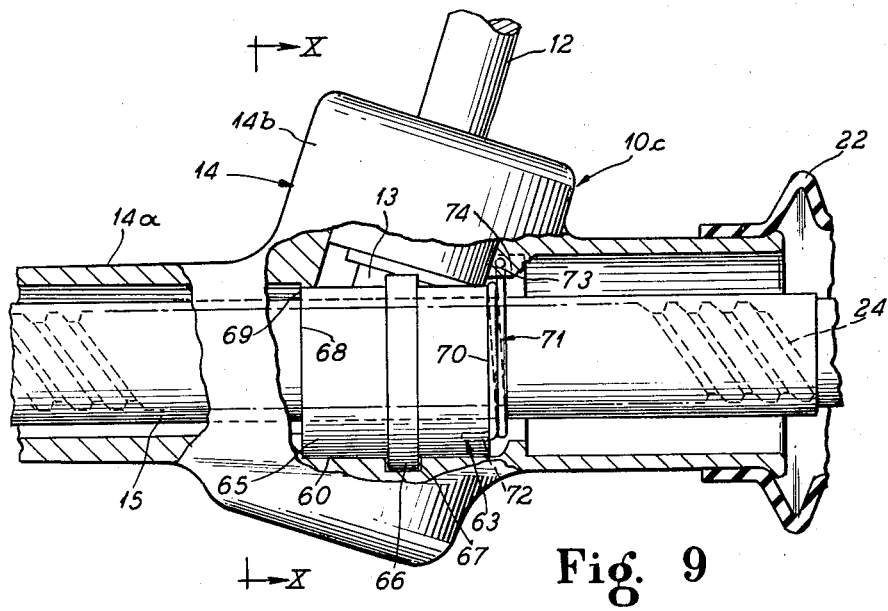
FIG. 9 is a view similar to FIG. 2 of another modified rack and pinion gear according to this invention wherein a spring biased wedge has continuous contact with the rack bar and housing opposite the pinion and eliminates the eccentric bearing in the end of the pinion housing.
Figure 10:
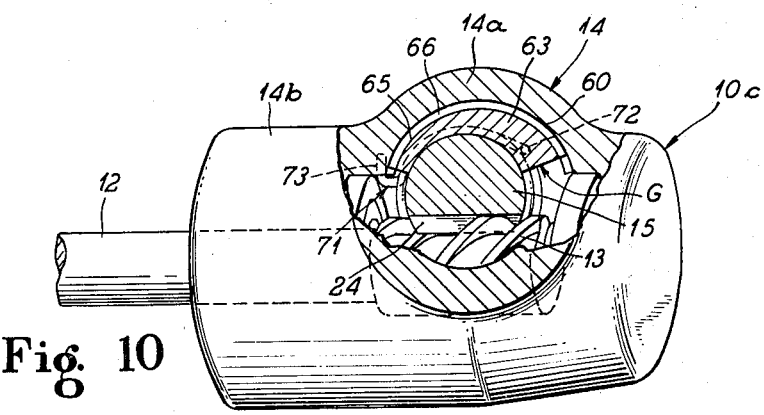
FIG. 10 is a transverse cross-sectional view along the line X—X of FIG. 9 with parts in elevation.
Figure 11:
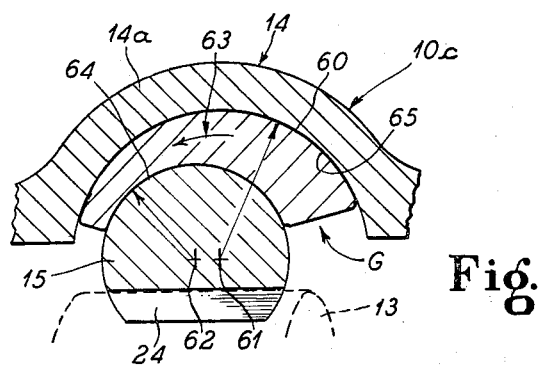
FIG. 11 is an enlarged fragmental transverse section view showing the eccentric arrangement of the wedge of FIGS. 9 and 10 to provide continuous bearing engagement with both the rack bar and housing.

In a third modification 10c, shown in FIGS. 9 to 11, parts corresponding with parts described in FIGS. 1 to 8 have also been marked with the same reference numerals.

In the assembly 10c, as shown in FIG. 9, the end bearing 30 of the embodiments 10, 10a, and 10b has been eliminated and the rack bar 15 thus can shift radially as well as axially in the pinion housing 14a. However, the rack bar receiving portion 14a of the pinion housing has a recess 60, like the recess 50 of the assembly 10b but instead of being concentric to the rack bar, like the recess 50, this recess 60 is eccentric to the rack bar 15. As shown in FIG. 11, the recess 60 has a center 61 laterally spaced from the axial center 62 of the rack bar 15. A wedge shaped gap G is thus provided between the rack bar 15 and the housing recess 60.

A metal wedge 63 fills the gap G between the rack bar and the recess 60 embracing the side of the rack bar 15 opposite the pinion 13 in full bearing contact therewith along its concave side 64. The wedge 63 is also in full bearing contact with the wall of the recess 60 along its convex side 65. Thus, the wedge 63 has continuous bearing contact with both the rack bar 15 and the housing 14a, receiving the rack bar in slidable relation through its concave side 64 and being rotatable in the recess 60 on its convex side 65.

To prevent axial shifting of the wedge 63, as best shown in FIG. 9, a peripheral rib is provided on the convex side 65 of the wedge midway between the axial ends of the wedge. This rib rides in a groove 67 in the housing recess 60.

As also shown in FIG. 9, the wedge 63 has an axial length spanning the rack bar 15 opposite the area where the rack teeth 24 mesh with the pinion 13. One axial end 68 of the wedge 63 is adjacent and can abut a shoulder 69 on the rack bar 15 while the opposite axial end 70 of the wedge 63 is adjacent and can abut a torsion coil spring 71. This spring 71 has one end 72 bent into a hole in the face of the end 70 of the wedge and the other end 73 seated in a hole of a lug 74 in the housing 14a. The spring 74 is biased to rotate the wedge 73 toward the narrow end of the gap G thereby urging the rack teeth 24 into full meshed engagement with the pinion.

The eccentric relationship of the rack bar 15 and recess 16 of the housing portion 14a in this modification 10c permits full continuous bearing contact between the wedge, the wall of the recess 60 and the rack bar 15 and the absence of the end bearing 30 used in the other modifications permits radial shifting of the rack bar in the housing under the influence of the wedge 63 which, of course, provides the support bearing for the rack bar.

It will be noted from FIG. 9 that the rack bar teeth 24 are inclined and that the pinion 13 has less of an inclination than in the embodiment 10 as shown in FIG. 2. Thus, the relative angular relationship between the pinion receiving housing portion 14b and the rack bar receiving housing portion 14a may vary considerably depending on the angulation of the meshing teeth of the pinion and rack bar.

From the above descriptions it will therefore be understood that this invention provides an eccentric wedge bearing providing a take-up adjustment in rack and pinion steering gear. The wedge bearing is conveniently mounted in a simplified pinion housing and may be staked in fixed position after proper meshed engagement is established between the rack and pinion or may be continuously biased to force the rack bar toward the pinion, thus providing an automatic wear take-up feature.

I claim as my invention:

1. A rack and pinion assembly which comprises a pinion housing, a pinion rotatably mounted in the housing, a rack bar slidable through the housing having rack teeth meshed with the pinion, a wedge bearing rotatably mounted in the housing having an eccentric portion engaging the rack bar opposite the rack teeth, and means for adjusting the bearing in the housing to maintain a desired bias on the rack bar to hold the rack and pinion teeth in proper meshed engagement.

2. An automotive rack and pinion steering gear which comprises a pinion housing having a longitudinal bore therethrough and an intersecting bore, a rack bar extending through the longitudinal bore, a pinion rotatably mounted in the intersecting bore, said rack bar having a rack with teeth meshed with the pinion teeth, tie rods at opposite ends of the rack bar, ball and socket joints connecting the tie rods with the ends of the rack bar, a steering column extending from the pinion for rotating the pinion, a wedge bearing rotatably mounted in the housing having an eccentric portion engaging the rack bar opposite the rack teeth, and means for adjusting the bearing in the pinion housing to maintain a desired bias on the rack bar to hold the rack and pinion teeth in proper meshed engagement.

3. The rack and pinion assembly of claim 1 wherein the bearing is tubular, envelops the rack bar and is rotatably mounted in one end of the pinion housing.

4. The rack and pinion assembly of claim 1 wherein the bearing is a wedge segment in the pinion housing overlying the rack bar.

5. The rack and pinion assembly of claim 1 wherein the bearing is tubular, is rotatably mounted in one end of the pinion housing and has an eccentric portion overlying the rack bar and adapted to be rotated into biasing engagement with the surface of the rack bar opposite the pinion to maintain the rack and pinion in meshed engagement.

6. The rack and pinion assembly of claim 1 wherein the pinion housing has a counterbore in an end of the portion receiving the rack bar and the bearing is rotatably mounted in the counterbore.

7. The rack and pinion assembly of claim 1 wherein the bearing is rotatable in an end of the housing, envelops the rack bar, and engages the rack bar opposite the rack teeth.

8. The assembly of claim 7 wherein the bearing is staked to the housing.

9. The assembly of claim 7 wherein a spring biases the bearing into engagement with the rack bar.

10. The steering gear of claim 2 wherein the wedge bearing is a tube rotatable in an end of the pinion housing freely enveloping the rack bar with an eccentric portion engaging the side of the rack bar opposite the rack teeth.

11. The steering gear of claim 10 wherein the tube has a rack bar engaging small diameter inner end portion seated in a bore of the housing and a larger diameter outer end portion adapted to receive a tool to rotate the tube.

12. The steering gear of claim 2 wherein the wedge bearing is circumferentially slidable in the housing over the rack bar.

13. The rack and pinion assembly of claim 1, wherein the housing has a recess opposite and eccentric to the axis of the rack bar and the bearing is a wedge filling the gap between the recess and rack bar in continuous bearing contact with both said rack bar and housing.

14. The rack and pinion assembly of claim 13, including a torsion spring rotating the wedge in a wear take-up direction.

15. The rack and pinion assembly of claim 1, wherein the adjustable bearing is a wedge having a concave side slidably supporting the rack bar and a convex side rotatably engaging the housing.

16. The rack and pinion assembly of claim 15 wherein the wedge has a peripheral rib and the housing has a circumferential groove receiving said rib to hold the wedge against axial shifting in the housing.

17. The rack and pinion assembly of claim 1, wherein the adjustable bearing is a wedge filling a gap between the portion of the rack bar opposite the pinion and the housing, and a torsion spring biases said wedge in a direction to maintain it in full bearing contact with both the housing and the rack bar.

* * * * *